United States Patent [19]
Rabe et al.
[11] Patent Number: 5,051,215
[45] Date of Patent: Sep. 24, 1991

[54] CURING PRECERAMIC POLYMERS BY EXPOSURE TO NITROGEN DIOXIDE

[75] Inventors: James A. Rabe; Jonathan Lipowitz, both of Midland, Mich.; Paul P. Lu, Hacienda Heights, Calif.

[73] Assignee: Dow Corning Corporation, Midland, Mich.

[21] Appl. No.: 496,850

[22] Filed: Mar. 21, 1990

[51] Int. Cl.[5] .......... D01F 9/10; D01F 11/04

[52] U.S. Cl. .......... 264/29.2; 264/56; 264/65; 264/83; 264/211.14; 264/211.16; 264/211.17

[58] Field of Search .......... 264/29.2, 82, 83, 85, 264/86, 56, 65, 63, 211.14, 211.16, 211.17

[56] References Cited

U.S. PATENT DOCUMENTS

| | | | |
|---|---|---|---|
| 4,052,430 | 10/1977 | Yajima | 260/448.2 D |
| 4,100,233 | 7/1978 | Yajima | 423/345 |
| 4,220,600 | 9/1980 | Yajima | 556/434 |
| 4,260,280 | 4/1981 | West | 556/430 |
| 4,283,376 | 8/1981 | Yajima | 423/345 |
| 4,298,559 | 11/1981 | Baney | 264/65 |
| 4,312,970 | 1/1982 | Gaul | 526/279 |
| 4,340,619 | 7/1982 | Gaul | 427/228 |
| 4,342,712 | 8/1982 | Yajima | 264/63 |
| 4,344,981 | 8/1982 | Imada et al. | 427/40 |
| 4,399,232 | 8/1983 | Yajima | 501/38 |
| 4,414,403 | 11/1983 | Schilling | 556/430 |
| 4,540,803 | 9/1985 | Cannady | 556/412 |
| 4,686,096 | 8/1987 | Schulz et al. | 264/29.2 |
| 4,743,662 | 5/1988 | Lipowitz | 427/39 |
| 4,816,497 | 3/1989 | Lutz et al. | 522/46 |
| 4,824,918 | 4/1989 | Bujalski et al. | 525/479 |
| 4,847,027 | 7/1989 | Lu | 264/65 |

FOREIGN PATENT DOCUMENTS 2236078 3/1974 Fed. Rep. of Germany .

OTHER PUBLICATIONS

West, 25 Polymer Preprints 4 (1984).
Noll, "Chemistry and Technology of Silicones" pp. 347-349 (1968).

*Primary Examiner*—Hubert C. Lorin
*Attorney, Agent, or Firm*—Roger E. Gobrogge

[57] ABSTRACT

A rapid method of infusibilizing (curing) preceramic polymers comprising treatment said polymers with gaseous nitrogen dioxide. The infusibilized polymers may be pyrolyzed to temperatures in excess of about 800° C. to yield ceramic materials with low oxygen content and, thus, good thermal stability. The methods are especially useful for the production of ceramic fibers and, more specifically, to the on-line production of ceramic fibers.

16 Claims, No Drawings

CURING PRECERAMIC POLYMERS BY EXPOSURE TO NITROGEN DIOXIDE

BACKGROUND OF THE INVENTION

The invention described herein was made in the performance of work uncer NASA Contract No. NAS 3-25641, and is subject to the provisions of Section 305 of the National Aeronautics and Space Act of 1958, as amended (42 U.S.C. 2457).

The present invention relates to a rapid method of infusibilizing (curing) preceramic polymers comprising treating said polymers with gaseous nitrogen dioxide. The infusibilized polymers produced thereby may be pyrolyzed at temperatures in excess of about 800° C. to yield ceramic materials with low oxygen content and, thus, good thermal stability. The methods of this invention are especially useful for the production of ceramic fibers and more specifically, to the on-line production of ceramic fibers.

It is well known in the art that preceramic polymers which are rapidly heated to ceramification temperatures often melt and lose their shape. To prevent this from occurring, the preceramic polymers are infusibilized (cured) prior to ceramification. Numerous methods of infusibilization have been suggested in the prior art. One such method in widespread use merely involves heating the polymers in air at temperatures below their melting point. This method, however is slow and incorporates a large amounts of oxygen into the polymer. When such oxygenated polymers are pyrolyzed at temperatures in excess of about 1300° C., the oxygen is lost resulting in a porous ceramic with decreased tensile strength. Despite these disadvantages, this method is still utilized to infusibilize polycarbosilane polymers in the commercial production of NICALON TM fiber by Nippon Carbon Co.

Lipowitz in U.S. Pat. No. 4,743,662 teaches another method of infusibilizing preceramic polymers involving treatment of said polymers with a plasma energy source. It is taught therein that high energy electrons interact with neutral gas molecules in the plasma thereby forming unique species such as metastable species, atoms, radicals and ions. These unique species interact with the preceramic polymer thereby rendering the polymer infusible.

Likewise Lutz et al. in U.S. Pat. No. 4,816,497 and Bujalski et al. in and U.S. Pat. No. 4,824,918 teach methods of infusibilizing various preceramic polymers by treatment with UV light.

Yajima et al. in U.S. Pat. Nos. 4,220,600, 4,283,376, 4,342,712 and 4,399,232 also disclose a method of using gamma ray or electron beam irradiation for curing preceramic modified polycarbosilane fibers.

Verbeek et al. in German Patent 2,236,078 teach the formation of silicon carbide moldings by pyrolyzing carbosilane resins to temperatures between 800° and 2000° C. It is disclosed therein at pages 7 and 8 that these fibers may be rendered infusible by treatment with any of a large number of oxidizing agents including nitrogen oxides. (page 8 line 10) The inventors therein, however, apparently considered each of the agents in the list equivalent and were unaware of the unexpected results the present inventors have discovered in the use of nitrogen dioxide. Additionally, it is noted that despite the expansive listing of oxidizing agents the examples of Verbeek et al. only teach the use of a hot air cure.

Lu et al. in U.S. Pat. No. 4,847,027 teach infusibilizing preceramic polymers by exposure to nitric oxide. The ceramic materials produced thereby have low oxygen content excellent physical properties and good thermal stability. This reference, however, is specifically limited to the use of nitric oxide. In addition, it is taught therein that this agent requires an extended period of time to infusibilize said polymers (≧2 hours) and generally requires the use of elevated temperatures. (See the Examples therein and comparative Example 20 included in this disclosure.)

The present inventors have now unexpectedly found that preceramic polymers may be rapidly rendered infusible by exposure to nitrogen dioxide. The ceramics obtained upon pyrolysis of such polymers have low oxygen contents and excellent physical properties.

SUMMARY OF THE INVENTION

The present invention relates to a method of infusibilizing preceramic polymers. The method comprises treating the preceramic polymer with gaseous nitrogen dioxide for a time sufficient to render the preceramic polymer infusible. This method has several distinct advantages over the prior art set forth supra:

1) The method is very rapid. For instance, the polymers herein have been infusibilized in as little as 5-10 minutes, with much quicker cure times possible. Lu et al., on the other hand, disclose that nitric oxide requires between about 2 and about 24 hours and Verbeek et al. teach exposure for 0.5-24 hours, with the examples each showing 2 hours. This allows for the possibility of using this curing agent on a continuous spinning line.

2) The curing methods of the invention incorporate only a small amount of oxygen into the polymer. Nitrogen dioxide is known to be a very reactive oxidizing agent. One skilled in the art, therefore, would not expect this agent to form low oxygen content products.

3) The method may be utilized at low temperatures. The prior art methods which use an oxidizing agent such as air or nitric oxide require elevated temperatures whereas the methods herein are effective at room temperature.

DETAILED DESCRIPTION OF THE INVENTION

The present invention is based on the discovery that preceramic polymers can be rendered infusible by treatment with nitrogen dioxide gas. As used herein, the term "infusible" is meant to indicate that the preceramic polymers will not melt and fuse together when rapidly heated to the ceramification temperature.

The cure process of this invention generally introduces only small amounts of oxygen into the polymers. When such low oxygen content polymers are pyrolyzed, ceramic materials with low oxygen content and, thus, high thermal stability are obtained. Generally it is preferred that the cure only introduce an amount of oxygen such that the ceramics obtained thereby have less than about 10% oxygen: it is more preferred that the resultant ceramic have less than about 7% oxygen.

The method of this invention is seen to be particularly advantageous for use in curing fibers and especially for curing fibers on on-line continuous spinning devices. These on-line devices spin polymers into continuous fibers, then immediately cure, pyrolyze and collect them in a very rapid, continuous manner. Such a device generally requires a very rapid cure method to maintain the efficiency of the on-line process. The method of this invention is seen to be effective for this purpose.

The method of the invention is, however, also particularly useful for off-line curing of fibers. During such a process fibers are spun and collected into batches. The batches are then cured and pyrolyzed. Such a method is considerably slower than the on-line method described above and, thus, a rapid cure is beneficial but not essential.

The preceramic polymers suitable for use in this invention are generally well known in the art. Said polymers must be capable of being converted to ceramic material by pyrolysis at elevated temperatures (>800° C.) and, preferably, should have a ceramic char yield of at least about 40 weight percent. It is further preferred that such polymers have softening points of between about 50° C. and about 300° C. such that the polymers may be melted and formed into the desired shape prior to infusibilization. Examples of such polymers include polycarbosilanes, polysilazanes, polysilanes, and mixtures thereof.

The polycarbosilanes useful herein have polymeric skeletons wherein silicon and carbon are the main structural units. Limited amounts of oxygen or other elements may, however, also be present as contaminants or through design. If oxygen is present in the polymer, it is preferably in an amount of less than about 10 weight percent, more preferably less than about 5 weight percent and most preferably less than about 1 weight percent. Other elements, if present, should generally be in amounts less than about 5 weight percent.

Suitable polycarbosilanes may be prepared by methods well known in the art. The actual method of preparation, moreover, is not critical so long as the resultant polymers possess the above properties. These polymers may, for example, be prepared by the method of Yajima et al. in U.S. Pat. Nos. 4,052,430, 4,100,233, 4,220,600, and 4,283,376, and Schilling in U.S. Pat. No. 4,414,403, all of which are incorporated herein in their entirety.

The preferred polycarbosilane to be utilized herein has repeating

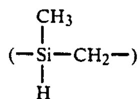

units such as that available commercially from Nippon Carbon Co.

The polysilazanes to be used in this invention are polymers with repeating Si-N units in their polymeric skeletal structure. Preferred polysilazanes and their method of preparation are described by Gaul in U.S. Pat. Nos. 4,312,970 and 4,340,619 which are incorporated herein in their entirety. An especially preferred polysilazane, hydridopolysilazane (HPZ), and its method of manufacture are described by Cannady in U.S. Pat. No. 4,540,803 which is incorporated herein in its entirety.

The polysilanes to be used in this invention are polymers with repeating Si-Si units in their polymeric skeletal structure. Suitable polysilanes and their method of manufacture are described by Baney et al. in U.S. Pat. No. 4,298,559, West in U.S. Pat. No. 4,260,780 and 25 Polymer Preprints 4 (1984), and Noll in "Chemistry and Technology of Silicones", 347-349 (translated second German ed.), Academic Press (1968), all of which are incorporated herein in their entirety.

The above preceramic polymers can be in nearly any form desired. The cure will occur most rapidly, however, when the substrate is in a form with a high surface area to volume ratio. For example, the methods disclosed herein may be utilized on polymeric compositions in the form of pellets, powders, flakes, foams, fibers, thin films and the like. It is preferred that the polymers of this invention are in the form of fibers, and even more preferred that said fibers be infusibilized under sufficient tension to prevent kinking. More specifically, the method of the invention is particularly suited for infusibilizing fibers on a continuous spinning line.

When the preceramic polymer is in the shape of a formed object such as a fiber it is not necessary to render the entire shaped article infusible. Rather, only the outer surfaces and sufficient interior portions directly adjacent to the outer surfaces need to be rendered infusible. The interior portions of the shaped article may be cured during the pyrolysis of the shaped article to elevated temperature. Simply rendering the exterior infusible will prevent the shaped articles from fusing together during the pyrolysis unless a break in the exterior surface occurs which allows the uncured interior to leak out.

After the above polymer has been formed into its desired shape, it is infusibilized by exposure to nitrogen dioxide gas. During this exposure, factors such as nitrogen dioxide gas concentration, exposure time and cure temperature all need to be considered. Generally, higher gas concentrations and higher temperatures result in quicker cures with longer exposure times resulting in a greater degree of cure. This enhanced rate and extent of cure, however, must also be weighed against the larger quantities of oxygen which are incorporated under the same conditions.

Generally, the concentration of $NO_2$ to be utilized should be sufficient to cure the polymer at the desired rate and temperature without the incorporation of excess oxygen. This concentration, therefore, can vary over a wide range of from about 0.1 to about 100 volume percent, with the upper limit of this range being limited in certain instances by polymers which spontaneously ignite when exposed to such conditions. If the nitrogen dioxide is utilized in other than its neat form, it is usually diluted in an inert gas carrier such as argon, nitrogen or helium.

Nitrogen dioxide concentrations in the range of about 0.5 to about 25 volume percent are often preferred for off-line fiber applications with concentrations in the range of from about 2 to about 10 volume percent being more preferred therein. Such concentrations provide cures in about 5 to about 30 minutes at temperatures in the range of about 25 to about 160° C. without the incorporation of excess oxygen. For on-line cure, higher concentrations are often utilized.

In addition to exposure to nitrogen dioxide gas it is also contemplated herein that the polymer may be concomitantly or sequentially exposed to other reactive gases. For instance, it is within the scope of this invention to expose the cured polymers to a boron-containing gas to produce substantially crystalline silicon The temperature for infusibilization should be one which will cure the polymer in the desired nitrogen dioxide gas concentration at the desired rate without the incorporation of excess oxygen. This temperature varies over a wide range of from about room temperature to the softening point of the polymer generally in the range of from about 25° C. to about 300° C. For off-line cures it may generally be preferred to use lower temperatures such as from about room temperature to about 175° C. since the addition of excess energy is thereby avoided. For on-line cures elevated temperatures such as about 50° C. to about 300° C. are generally used since the elevated temperatures increase the rate of cure. In addition to the above static cure temperatures, it is also contemplated herein that the infusibilization temperature may be changed while the fiber is exposed to the curing gas. For example, the fiber may be exposed to nitrogen dioxide gas while the temperature of infusibilization is raised from room temperature to 125° C. at a rate of 5°-10° C./minute.

The time required for nitrogen dioxide to cure preceramic polymers is generally a time which is sufficient to prevent unacceptable deformation of the polymer during ceramification and yet short enough to prevent the excessive oxygen incorporation that occurs when the polymer is exposed to nitrogen dioxide for longer periods. A sufficient time is generally in the range of about 1 second or less to about 2 hours with a range of less than about 10 seconds being preferred for on-line procedures and less than about 30 minutes being preferred for off-line procedures. In a typical off-line procedure, small bundles of polycarbosilane fibers may be cured in about 15 minutes when exposed to 5 volume percent nitrogen dioxide at 125° C. under atmospheric pressure.

As described above, a particularly preferred embodiment of this invention involves curing fibers on a continuous on-line fiber spinning device. Generally, the use of such a device is conducive to curing since: (1) the fibers on a spinning line are well separated allowing for easy diffusion of the gas to and through the fibers; (2) the fibers are not in contact with each other during pyrolysis such that a lower degree of infusibilization is necessary to prevent the fibers from sticking together: (3) the fibers can be readily heated to increase the curing speed; and (4) higher concentrations of curing agent can be used. The use of nitrogen dioxide with such a device is particularly advantageous since it may provide the rapid cure rate necessary for efficient use of such a process.

The preceramic polymers which have been infusibilized by the methods disclosed herein may then be ceramified by heating to temperatures of greater than about 800° C. in an inert environment. Since these polymers have been infusibilized, rapid heating rates may generally be used without their form being destroyed. The preferred ceramification temperatures herein are in the range of from about 1000° C. to about 2000° C.

The following non-limiting examples are provided so that one skilled in the art may more fully understand the invention.

EXAMPLES 1-18

Table 1 demonstrates the effectiveness of curing various preceramic polymers under differing cure conditions. The typical experimental procedure was as follows:

Polycarbosilane (PCS) resin was obtained from Nippon Carbon Co.

Methylpolysilane resin was prepared by the method of U.S. Pat. No. 4,298,559.

Hydridopolysilazane resin was prepared by the method of Cannady et al. in U.S. Pat. No. 4,540,803.

A sample of the resin was melt spun at about 280° to about 320° C. on a monofilament device with an orifice diameter of 0.01 inch and the fiber extruded therefrom. A small bundle of this uncured fiber (about 0.05 g) was suspended vertically in a glass reactor vessel by hanging it over a glass rod. The vessel was purged for at least 5 minutes with argon at a rate of greater than 10 volume exchanges per minute.

When elevated temperatures were used, heating tape was wrapped around the walls of the vessel to heat the walls to the desired temperature during the purge. Temperature was controlled by a thermocouple placed on the outside of the vessel wall away from contact with the heating tape. Once the desired temperature was achieved, the vessel was allowed to equilibrate for at least 5 additional minutes before starting the cure.

Nitrogen dioxide diluted to the desired concentration in argon was fed through the vessel at about 5 volume exchanges per minute during the curing period. After the desired cure interval, nitrogen dioxide flow was discontinued, argon flow was reinstituted at greater than 10 exchanges per minute to purge the vessel, and the heating tape, if used, was removed to let the fiber cool quickly.

The cured fiber bundles were placed on a sheet of Grafoil TM and pyrolyzed by heating at 3° C. per minute to 1200° C. under nitrogen in a Lindberg tube furnace to check the effectiveness of the cure.

Table 1 displays the result of the various nitrogen dioxide cure conditions. The first 2 examples show that high nitrogen dioxide concentration for extended periods cure PCS fibers although the oxygen content was high. Examples 3-5 show the effect of cure time on PCS fibers treated with 3 volume % nitrogen dioxide at 25° C. It can be seen that longer exposures generally provided better curing but also increased the amount of oxygen incorporated in the fiber. Examples 6-11 show the effect of raising the cure temperature from 25° C. to 160° C. on PCS fibers treated with 1.5 volume % nitrogen dioxide for 5 minutes. It will be noted that the higher temperatures generally provided more rapid curing. Examples 12 and 13 show the effect of increasing the nitrogen dioxide concentration on PCS fibers treated at 125° C. for 5 minutes. It can be seen that the higher gas concentrations provided more rapid curing but also increased the oxygen concentration in the fiber. Examples 14 and 15 show that the cured fibers may subsequently be exposed to boron trichloride gas before pyrolysis to make them suitable for conversion to substantially crystalline SiC fiber. In both cases the desired products were obtained after further pyrolysis to 1800° C. Example 16 shows that exposing methylpolysilane fibers to 1.5 volume percent nitrogen dioxide at 25° C. for 45 minutes provides well cured fibers. Examples 17 and 18 show that cured HPZ fibers can be obtained by exposing them to nitrogen dioxide. The oxygen content in these samples was greater than in corresponding polycarbosilane examples but the cure rate was also greater.

TABLE 1

| | | Nitrogen Dioxide Cure Conditions and Results | | | Properties After Pyrolyzing | |
|---|---|---|---|---|---|---|
| Ex No | Fiber Type | Temp (°C.) | Time (min) | Conc $NO_2$ (vol %) | O cont | Condition of Fiber |
| 1 | PCS | 25 | 30 | 25% | 25% | Easily Separable |
| 2 | PCS | * | * | 25% | 30% | Easily separable |
| 3 | PCS | 25 | 30 | 3% | 5.61% | Easily separable |
| 4 | PCS | 25 | 10 | 3% | 3.38% | Matted fiber |
| 5 | PCS | 25 | 5 | 3% | 2.72% | Badly matted fiber |
| 6 | PCS | 25 | 5 | 1.5% | 2.23% | Mostly fused |
| 7 | PCS | 67 | 5 | 1.5% | 3.79% | Partially fused |
| 8 | PCS | 85 | 5 | 1.5% | 1.73% | Fused |
| 9 | PCS | 85 | 5 | 1.5% | 3.59% | Partially fused |
| 10 | PCS | 125 | 5 | 1.5% | 3.88% | Partially fused |
| 11 | PCS | 160 | 5 | 1.5% | 3.33% | Matted fiber |
| 12 | PCS | 125 | 5 | 3% | 5.14% | Separable |
| 13 | PCS | 125 | 5 | 7% | 6.45% | Easily separable |
| 14 | PCS | 25 | 20 | 3% | 6.19% | Easily Separable (1) |
| 15 | PCS | 25 | 20 | 3% | — | Easily Separable (2) |
| 16 | MPS | 25 | 45 | 1.5% | — | Easily separable |
| 17 | HPZ | 25 | 20 | 3% | 33.7% | Weak but separable |
| 18 | HPZ | 25 | 5 | 1.5% | 18.4% | Separable |

*The fiber was heated from 25° C. to 100° C. at 0.7° C./min with no hold at temperature (1) The fiber was additionally treated with 30% $BCl_3$ (after cure) as the temperature was raised from 25° C. to 140° C. at 0.5° C./minute.

(2) The fiber was additionally treated with 5% $BCl_3$ (after cure) as the temperature was raised from 25° C. to 140° C. at 0.5° C./minute.

PCS = polycarbosilane; MPS = methylpolysilane; HPZ = hydridopolysilazane

COMPARATIVE EXAMPLE 19

This example shows the unexpectedly better results of nitrogen dioxide curing over the prior art "hot air cure". A sample of polycarbosilane resin was melt spun into fibers in the same manner as the above Examples. A small bundle of this uncured fiber (about 0.045 g) was hung over a glass rod in an oven and heated in air from room temperature to 175° C. at 1.25° C./minute (total of 2 hours at elevated temperature) to cure said fiber. The cured fiber was then pyrolyzed in the same manner as the above Examples.

The pyrolyzed product was too matted to allow separation of individual filaments for testing. Moreover, 8.9% oxygen was incorporated into these pyrolyzed fibers even though the cure was inadequate.

This Example clearly shows that exposure to hot air for 2 hours fails to adequately cure these polycarbosilane fibers. By contrast, Examples 1–15 show that as little as 30 minutes of exposure to 3% nitrogen dioxide (by volume) at room temperature or 5 minutes of exposure to 3% nitrogen dioxide (by volume) at 125° C. results in separable fibers with lower oxygen content.

COMPARATIVE EXAMPLE 20

This example shows the unexpectedly better results of nitrogen dioxide curing over the prior art nitric oxide cure. A sample of polycarbosilane resin was melt spun into fibers in the same manner as the above Examples. A small bundle of this uncured fiber (about 0.0404 g) was suspended vertically in a glass reactor vessel by hanging it over a glass rod. The vessel was purged for at least 5 minutes with argon at a rate of greater than 10 volume exchanges per minute.

100% nitric oxide gas was then introduced at a rate of 200 cc/min into the reactor vessel and the fiber allowed to cure at room temperature in this environment for 1 hour. The fiber was then pyrolyzed as in the above Examples.

The fiber bundle was almost completely fused during this process, indicating the inadequacy of the cure conditions.

The above experiment was repeated on a 0.0193 g sample of the same fiber except that the reactor vessel wall was held at 100° C. during the nitric oxide exposure (heating was performed in the same manner as described for Examples 1–18).

After pyrolysis, this bundle was also too matted to allow separation of individual filaments for testing, again indicating the ineffectiveness of the cure.

By contrast, Examples 1–15 indicated that as little as 3% by volume nitrogen dioxide will cure polycarbosilane fibers in as little as 30 minutes or 3% by volume nitrogen dioxide will cure the same fibers in only 5 minutes at 125° C.

That which is claimed is:

1. A method of infusibilizing a preceramic polymer selected from the group consisting of polycarbosilanes, polysilanes and polysilazanes comprising treating the preceramic polymer with gaseous nitrogen dioxide at a temperature in the range of from about room temperature up to about 300° C. for less than about 2 hours to render the preceramic polymer infusible.

2. The method of claim 1 wherein the infusibilized preceramic polymer pyrolyzes to a ceramic which contains less than about 10 weight percent oxygen.

3. The method of claim 2 wherein the infusibilized preceramic polymer pyrolyzes to a ceramic which contains less than about 7 weight percent oxygen.

4. The method of claim 2 wherein the preceramic polymer is in the form of a fiber.

5. The method of claim 2 wherein the nitrogen dioxide is present in a concentration of about 0.5 to 25 weight percent diluted in an inert gas.

6. The method of claim 4 wherein the nitrogen dioxide is present in a concentration of about 0.5 to 25 weight percent diluted in a inert gas.

7. The method of claim 2 wherein the nitrogen dioxide is present in a concentration of about 2 to 10 weight percent diluted in an inert gas.

8. The method of claim 2 wherein the time sufficient to render the preceramic polymer infusible is less than about 30 minutes.

9. The method of claim 5 wherein the preceramic polymer is a polycarbosilane.

10. The method of claim 5 wherein the preceramic polymer is a methylpolysilane.

11. The method of claim 5 wherein the preceramic polymer is a polysilazane.

12. The method of claim 5 wherein the preceramic polymer is hydridopolysilazane.

13. A method of infusibilizing a preceramic fiber selected from the group consisting of polycarbosilanes, polysilanes and polysilazanes on a continuous spinning line comprising treating said preceramic fiber with gaseous nitrogen dioxide at a temperature in the range of from about room temperature up to about 300° C. for less than about 2 hours to render said preceramic polymer infusible as the fiber is continuously processed from spinning through pyrolysis.

14. The method of claim 13 wherein the infusibilized preceramic fiber pyrolyzes to a ceramic which contains less than about 10 weight percent oxygen.

15. The method of claim 14 wherein the polymer is treated at a temperature in the range of about 50° to about 300° C.

16. The method of claim 15 wherein the time sufficient to render the preceramic fiber infusible is less than about 10 seconds.

* * * * *